(12) United States Patent
Nakata

(10) Patent No.: US 6,771,295 B2
(45) Date of Patent: Aug. 3, 2004

(54) ELECTRONIC APPARATUS HAVING OPERATION PANEL

(75) Inventor: Kenichirou Nakata, Nara (JP)

(73) Assignee: Sharp Kabushiki Kaisha, Osaka (JP)

(*) Notice: Subject to any disclaimer, the term of this patent is extended or adjusted under 35 U.S.C. 154(b) by 204 days.

(21) Appl. No.: 09/902,743

(22) Filed: Jul. 12, 2001

(65) Prior Publication Data

US 2002/0005828 A1 Jan. 17, 2002

(30) Foreign Application Priority Data

Jul. 12, 2000 (JP) .................................... P2000-211355

(51) Int. Cl.[7] .............................................. G09G 5/00
(52) U.S. Cl. ..................................... 345/904; 345/169
(58) Field of Search ............................... 345/904, 618, 345/211, 156, 168, 169, 87

(56) References Cited

U.S. PATENT DOCUMENTS

| | | |
|---|---|---|
| 4,307,392 A | 12/1981 | Loshbough et al. |
| 4,734,687 A * | 3/1988 | Jones |
| 4,845,467 A | 7/1989 | Nagaoka |
| 5,394,525 A | 2/1995 | Kuwana et al. |
| 5,724,240 A | 3/1998 | Yoon |
| 5,991,896 A | 11/1999 | Cho |

FOREIGN PATENT DOCUMENTS

| | | |
|---|---|---|
| GB | 2 284 075 A | 5/1995 |
| JP | A612335 | 1/1994 |
| JP | A7168740 | 7/1995 |
| JP | A8263020 | 10/1996 |
| JP | A9309245 | 12/1997 |

* cited by examiner

Primary Examiner—Regina Liang
(74) Attorney, Agent, or Firm—Birch, Stewart, Kolasch & Birch, LLP

(57) ABSTRACT

A malfunction in an operation panel serving as a man-machine interface of electronic apparatus is detected and recovered adequately. A control apparatus stores data to be displayed on a display section in an operation panel in the form of coded information. The display contents of the display section are transmitted to the control apparatus in an inverse data stream according to the predetermined rules or at regular time intervals, so that the stored information is compared with developed data. When there is a discrepancy in data, the display contents are retransmitted, and transmitted in an inverse data stream again for comparison. When there is still a discrepancy in data, the operation panel is initialized, and the display data is transmitted in an inverse data stream once again for comparison. When there is still a discrepancy in data, supply of power to the operation panel is stopped and an alarm is given.

9 Claims, 5 Drawing Sheets

ELECTRONIC APPARATUS HAVING OPERATION PANEL

BACKGROUND OF THE INVENTION

1. Field of the Invention

The present invention relates to electronic apparatus having an operation panel as a man-machine interface, which includes communication apparatuses such as a facsimile apparatus, and information processing apparatuses. More particularly, the invention relates to detection and recovery of malfunctions in the operation panel.

2. Description of the Related Art

Conventionally, a communication apparatus and an information processing apparatus generally have an operation panel as a man-machine interface with a user. The operation panel is a portion where the user directly touches or comes in closest proximity. Static electricity often collects on the user due to friction with the clothes he is wearing. In cases where the static electricity collects on the user, the static electricity on the user is discharged to the operation panel, and a high voltage developed by the discharge often causes a malfunction in the operation panel. Hence, the operation panel is a portion that needs the antistatic measure most. For this reason, measures have been taken for the operation panel, according to which an additional conducting material is employed to reduce static influence on a circuit portion, the structure is refined, etc. The placement of the circuit component or the like is also concerned in many cases to reduce the static influence.

For example, Japanese Unexamined Patent Publication JP-A 9-309245 (1997) proposes an idea of reducing static-induced malfunctions in the operation panel of a recording apparatus by a structure in a mechanism portion of the operation panel without employing any additional antistatic component. Such a static preventive measure by means of mechanism is one of the important antistatic measures. Japanese Unexamined Patent Publication JP-A 8-263020 (1996) discloses a prior art of a liquid crystal driving method such that a display content on the liquid crystal panel will not be changed even when a power-on-reset function is triggered by influence of noises or the like.

Generally, electronic apparatus that is furnished with a microcomputer and runs a program has a possibility of a noise-induced malfunction, causing deviation from normal operations according to the original program. Japanese Unexamined Patent Publication JP-A 6-12335 (1994) proposes an idea to divide a RAM area of a facsimile apparatus into a plurality of memory areas, and store various parameters of the same contents in each memory area. Here, a CPU calculates and stores a checksum for each block in the memory areas. The CPU calculates the checksum periodically, and compares the latest checksum with the stored checksum, and when there is a discrepancy, the CPU calculates the checksum of another memory area and uses various parameters in the correct memory area, whereby error recovery is achieved. Japanese Unexamined Patent Publication JP-A 7-168740 (1995) discloses a watchdog method adapted to a videocassette recorder enclosing two interconnected microcomputers, according to which, when one of the microcomputers is in an error state, the other microcomputer detects the error and automatically resets the microcomputer in the error state. Here, upon receipt of a request command of watchdog data from the other microcomputer, the recipient microcomputer transmits the data in responding to the command, so that an error is detected by checking whether the data is correct or not.

The operation panel serving as a man-machine interface in a communication apparatus, an information processing apparatus or the like is generally isolated from the main circuit portion in the main body, and often arranged in the easiest-to-use design or placed in the easiest-to-use location for the user. In this case, as a typical embodiment, the operation panel is placed so as to operate independently from the main circuit portion, and connected to the main circuit portion via a cable or a wire. However, with portable electronic apparatus that should meet the need of downsizing, there may be a case where the operation panel is formed on the surface of the flat housing, and the main circuit portion is placed in the interior of the housing. In any case, the operation panel serving as the man-machine interface is most susceptible to static electricity. In particular, when an electronic circuit for driving a display section and an electronic circuit for generating an electrical signal in response to an input operation at an input operating section are provided to the interior of the operation panel, the electronic circuit portions are susceptible to static electricity, and a static-induced malfunction of the electronic circuits in the operation panel results in a serious problem.

The method of reducing the static influence by means of mechanism as disclosed in JP-A 9-309245 supra is certainly applicable. However, the influence of static electricity collected on the user varies in static voltage, applied portion, etc., and it is quite difficult to prevent the influence completely. A static-induced malfunction may mean, depending on an applied portion or strength of the static electricity, a bit error in a bit map memory that retains data for a display apparatus, or other types of malfunction, such as a runway of a program in a control portion that controls the operation panel, the latch-up in an LSI, etc. Therefore, it is necessary to take adequate recovery measures or countermeasures including prevention of a fatal damage for each occasion. The method described in JP-A 8-263020 supra is intended to prevent a malfunction caused by the power-on-reset function triggered when a noise signal is mixed into a power line, and therefore, this method cannot perform an adequate recovery process to restore the display content at the occurrence of a noise-induced malfunction such that changes the display content.

SUMMARY OF THE INVENTION

It is therefore an object of the invention to provide electronic apparatus having an operation panel and capable of performing adequate malfunction recovery at the occurrence of a static-induced malfunction in the operation panel.

The invention provides electronic apparatus having an operation panel which is provided with a display section and an input operating section and serves as a man-machine interface, comprising:

condition setting means for presetting a condition, under which an operation of detecting a malfunction in the operation panel is repeated;

information storing means for storing information transmitted as a display content for the display section of the operation panel;

content reading out means for reading out the display content displayed on the display section of the operation panel each time the condition set in the condition setting means is satisfied;

malfunction judging means for comparing the display content read out by the content reading out means and displayed on the display section with the information stored in the information storing means, and based on a comparison result, judging whether there is a malfunction in the operation panel; and malfunction recovering means for, when the malfunction judging means determines that there is a malfunction in the operation panel, effecting a predetermined control for malfunction recovery.

According to the invention, the electronic apparatus has the operation panel provided with the display section and input operating section and serving as a man-machine interface. The electronic apparatus having the operation panel includes the condition setting means, information storing means, content reading out means, malfunction judging means, and malfunction recovering means. The condition setting means presets a condition, under which an operation of detecting a malfunction in the operation panel is repeated. The information storing means stores information transmitted as a display content for the display section of the operation panel. The content reading out means reads out the display content displayed on the display section of the operation panel each time the condition set in the condition setting means is satisfied. The malfunction judging means compares the display content read out by the content reading out means and displayed on the display section with the information stored in the information storing means, and judges whether there is a malfunction in the operation panel, based on a comparison result. When the malfunction judging means determined that there is a malfunction in the operation panel, the malfunction recovering means effects the predetermined control for malfunction recovery. Because the detection of malfunctions in the operation panel is carried out repetitively, and the predetermined control for malfunction recovery is effected upon determining that there is a malfunction, a static-induced malfunction or the like can be recovered adequately. When no malfunction is detected, the malfunction recovery process is not executed. Hence, it is possible to eliminate an inconvenience such that the display section flickers due to the recovery process executed regardless of the absence of a malfunction.

In the invention, it is preferable that the malfunction judging means analyzes input information in the input operating section of the operation panel, and based on a result of analysis, judges whether there is a malfunction in the operation panel.

According to the invention, whether there is a malfunction or not is judged also with respect to input information to the input operating section that is susceptible to static electricity collected on the user or the like, and when the malfunction judging means determines that there is a malfunction, an adequate malfunction recovery process can be executed.

In the invention, it is preferable that the malfunction recovering means carries out a recovery process comprising retransmission of the information stored in the information storing means to the display section of the operation panel as a control for malfunction recovery, and when the malfunction is not recovered by the recovery process, supply of power to at least the operation panel is cut off.

According to the invention, the malfunction recovering means performs a recovery process comprising retransmission of the information stored in the information storing means to the display section of the operation panel as a control of malfunction recovery. When the malfunction is not recovered by the recovery process, the malfunction recovering means cuts off supply of power to at least the operation panel. Thus, for a malfunction such that can be recovered by merely retransmitting the display content, the recovery process is executed with the other components being less influenced, and for a malfunction such that cannot be recovered by such a recovery process, the malfunction is determined as being a critical malfunction or a failure, and supply of power to at least the operation panel is cut off, thereby making it possible to prevent fatal damage or the like.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1:
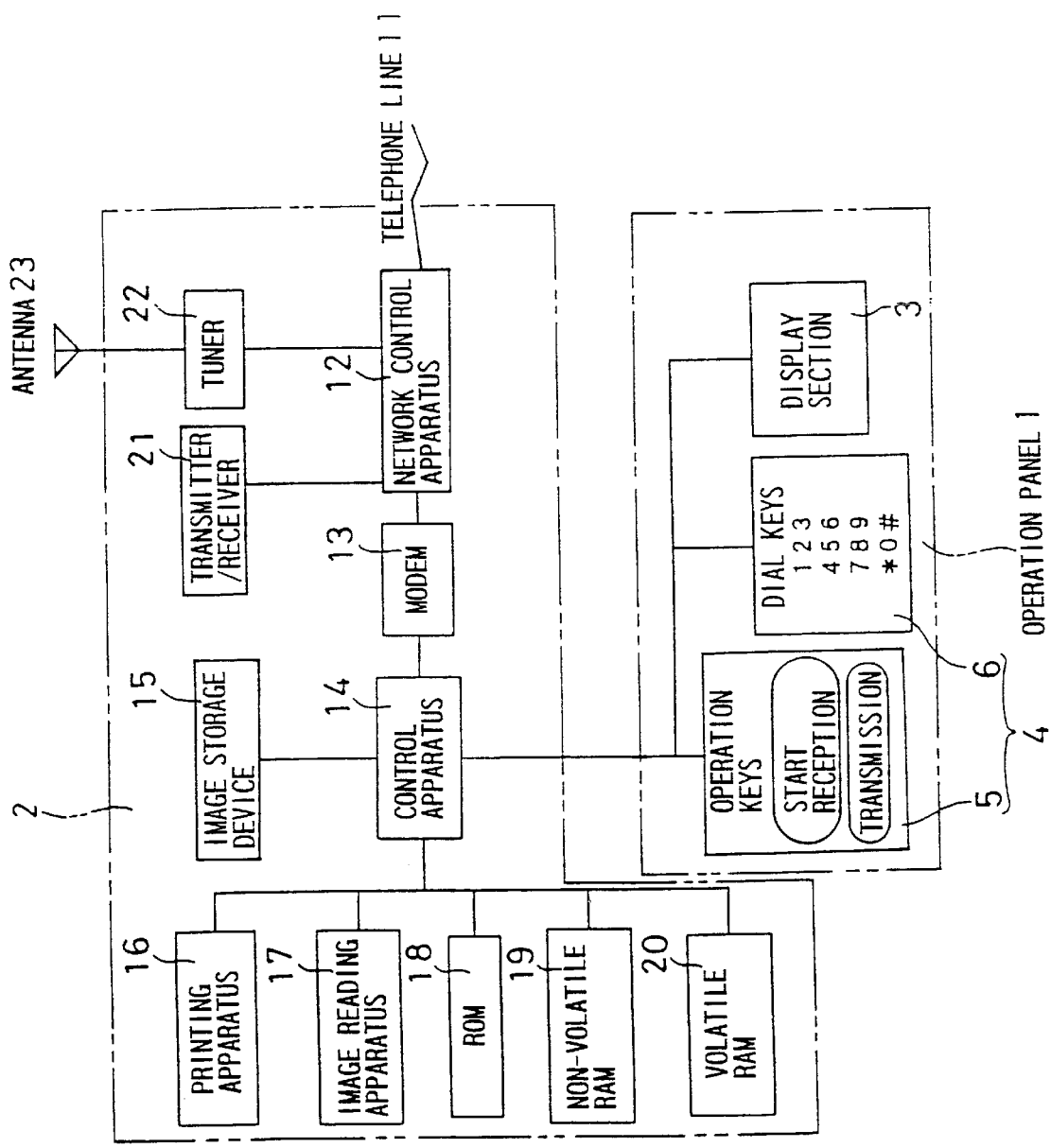
FIG. 1 is a block diagram schematically showing an electrical arrangement of a facsimile apparatus as one embodiment of the invention.

Now referring to the drawings, preferred embodiments of the invention are described below.

Figure 2:
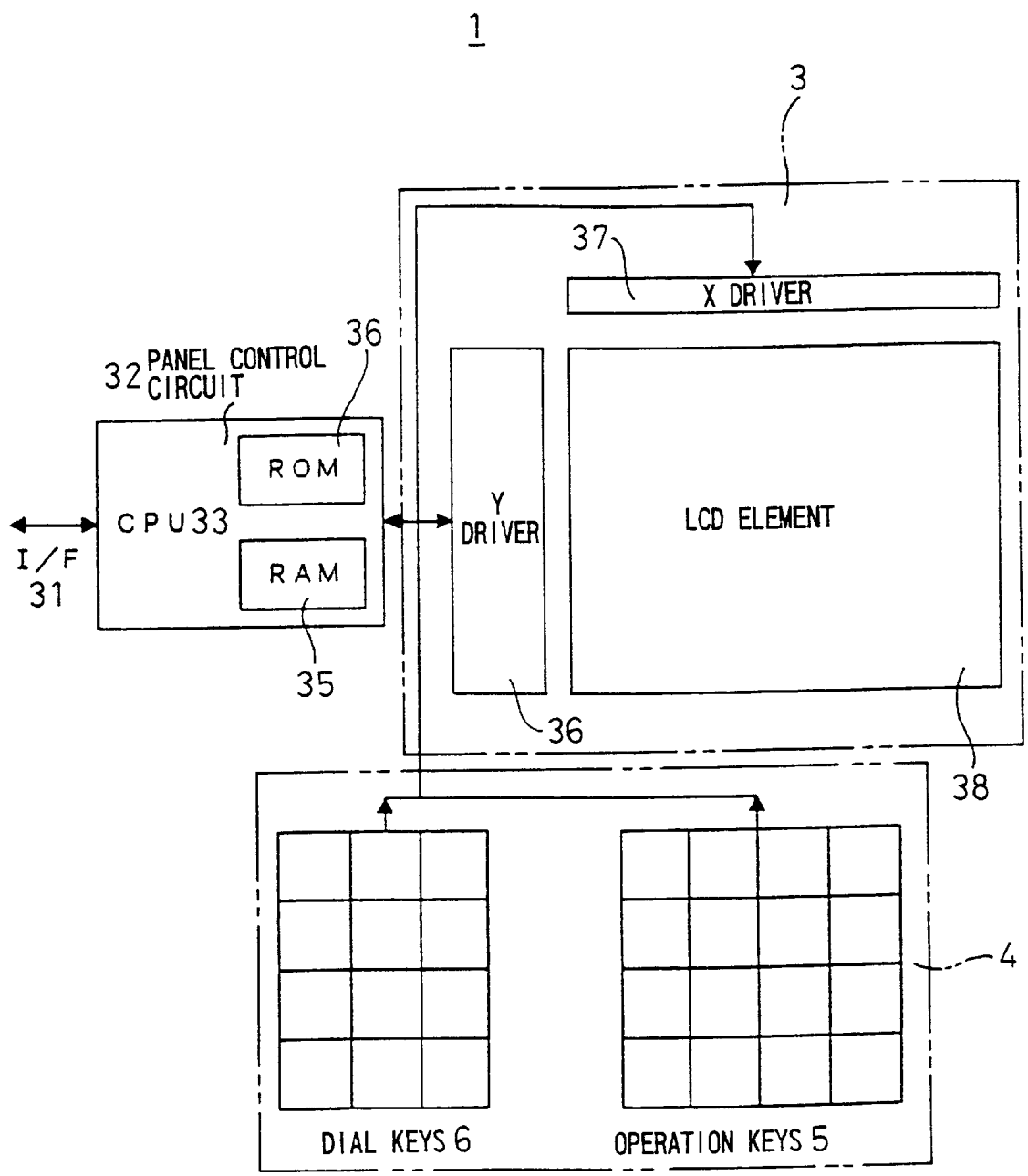
FIG. 2 is a block diagram showing an electrical arrangement of FIG. 1.
Figure 3:
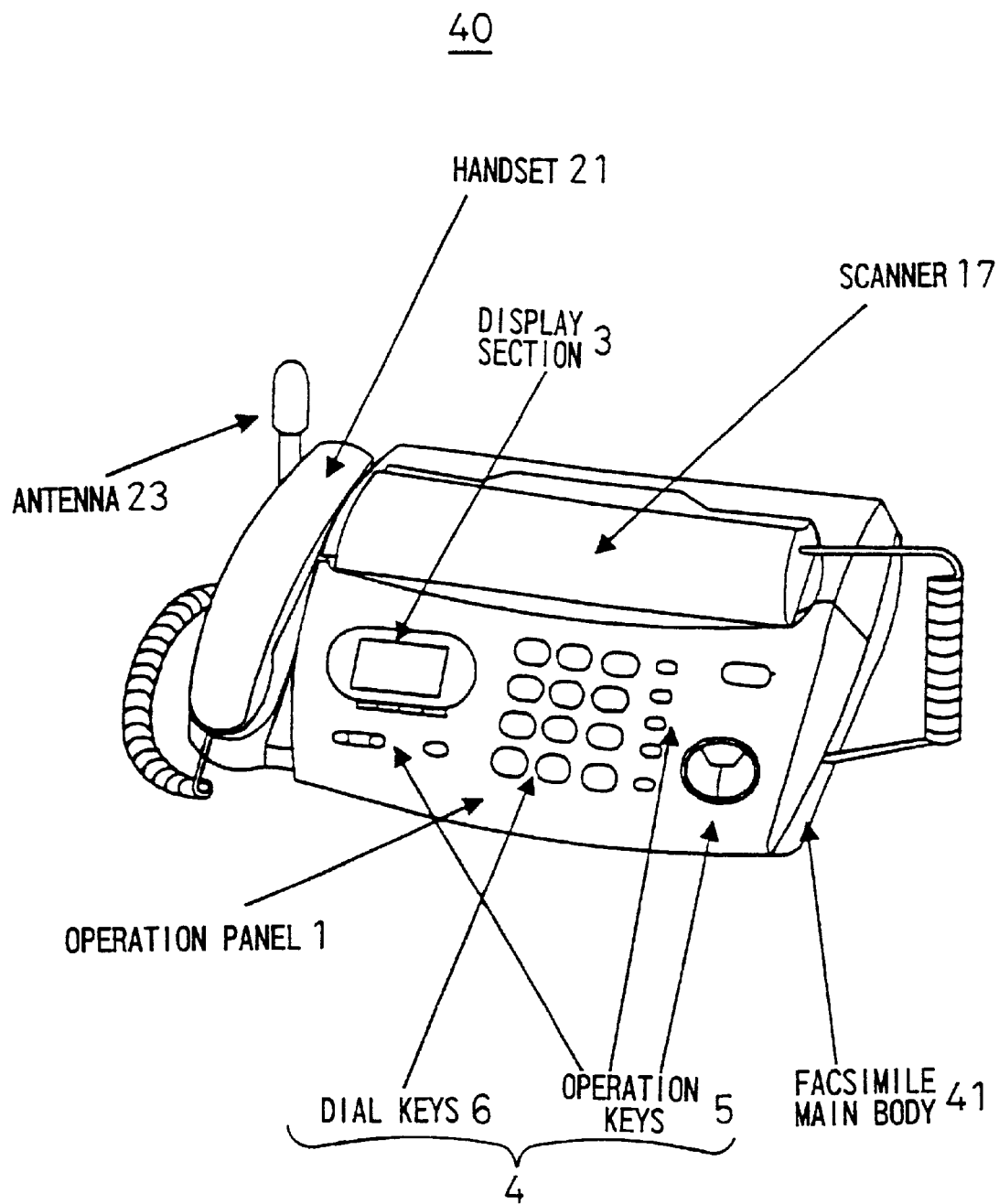
FIG. 3 is a perspective view showing an outward appearance arrangement of the facsimile apparatus of FIG. 1.

The invention is applicable to general electronic apparatus extensively, including a communication apparatus, an information processing apparatus, etc., but the following description will describe a facsimile apparatus as an example. FIG. 1 is a view schematically showing an electrical arrangement of the facsimile apparatus. FIG. 2 shows an electrical arrangement of an operation panel 1 of FIG. 1, and FIG. 3 is a view showing an outward appearance arrangement.

As shown in FIG. 1, the facsimile apparatus includes the operation panel 1 serving as a man-machine interface, and a main circuit 2 for conducting basic operations of a facsimile apparatus. The operation panel 1 is provided with a display section 3 on which information to be delivered to the user from the main circuit 2 or the like is displayed, and an input operating section 4 for use by the user at the input operation to input a command or information into the main circuit 2. The input operating section 4 is provided with operation keys 5 used in inputting commands for various operations of a facsimile apparatus, dial keys 6 used in inputting figures, such as a telephone number, etc.

The main circuit 2 of the facsimile apparatus is connected to a communication line, such as a telephone line 11, through a network control apparatus 12. The network control apparatus 12 monitors the states of the telephone line 11 or the like, and controls the telephone line 11 to be connected to a modem 13. The modem 13 modulates a digital signal representing an image to an analogue signal suitable to a communication network, such as the telephone line 11, and de-modulates the analog signal from the telephone line 11 or the like to a digital image signal used in printing. A control apparatus 14 is connected to the modem 13, an image storage device 15, a printing apparatus 16, an image reading apparatus 17, a ROM 18, a non-volatile RAM 19, a volatile RAM 20, etc. as well as to the operation panel 1.

The printing apparatus 16 is a unit that prints out an image received via the telephone line 11 or the like or read by the image reading apparatus 17, and a type employing the thermal method, electrophotographic method, ink jet method, or the like is used popularly. The image reading apparatus 17 is such an apparatus that reads an original document to be transmitted or copied, and of a type employing the micro reading method using a combination of a lens, a CCD line sensor, etc., or of the contact sensor method using a rod lens array or the like. The image storage device 15 is a unit that stores a read image or a received image. Providing this unit allows many complicated functions, such as interception by which data is received by the image storage device 15 when out of papers, transfer of a received image, and broadcasting by which a stored image is transferred to multiple recipients. The control apparatus 14, together with the ROM 18, non-volatile RAM 19, and volatile RAM 20 each serving as a storage device, effects control so as to determine an overall operation of the facsimile apparatus based on input information from the operation keys 5 and dial keys 6, information indicating the state from each unit in the apparatus, information of a signal transmitted via the telephone line 11 or the like, etc., provide a command to the entire apparatus, and to output a display command to the display section 3 on the operation panel 1. Also, the control apparatus 14 performs processing including compression of image information to shorten a transmission time and de-compression to restore a compressed image signal to the original pixel array information.

Storage devices connected to the control apparatus 14 include the ROM 18 that fixes storage contents and stores a program and the like, the non-volatile RAM 19 that saves storage contents after power is cut off, and the volatile RAM 20 that loses the storage contents once the power is cut off. The operation keys 5 and dial keys 6 are a unit for use by the user to input information or a command into the facsimile apparatus. The display section 3 is a unit where the facsimile apparatus displays information for the user, or gives guidance on operation. The network control apparatus 12 connects or disconnects the telephone line 11 and modem 13, and may reconnect the telephone line 11 to a transmitter/receiver 21, such as a handset, a tuner 22, and an antenna 23 when the telephone line 11 is not connected to the modem 13.

As shown in FIG. 2, the operation panel 1 of FIG. 1 is connected to the main circuit 2 through an interface (hereinafter, abbreviated to I/F occasionally) 31. The I/F 31 relays a signal from the main circuit 2 or a signal transmitted from the operating panel 1 to the main circuit 2 through a panel control circuit 32. The panel control circuit 32 includes a CPU 33, a ROM 34, a RAM 35, etc. The CPU 33 effects control on the man-machine interface through the operation panel 1 according to a program preset in the ROM 34. The display section 3 on the operation panel 1 includes a Y driver 36 and an X driver 37 each serving as a display driving circuit, and displays an image by means of an LCD element 38 using liquid crystal. The operation keys 5 may include input operation keys in various sizes placed at different locations, but FIG. 2 illustrates a state where the operation keys 5 are centered to one place for ease of explanation. The dial keys 6 include numeric characters from 0 to 9 and "*" and "#" marks, which are usually aligned in a predetermined manner. The panel control circuit 32 controls elements provided at man-machine contacts, and comprises the one-chip CPU 33 incorporating the ROM 34 and RAM 35. It should be appreciated, however, that the panel control circuit 32 does not necessarily comprise the one-chip CPU 33 in the invention, and the ROM 34 and RAM 35 may be separated from the CPU 33.

The panel control circuit 32 operates chiefly to run an image display job by storing a bit map developed from the display content generated in the main circuit 2 into the RAM 35, and transmitting a signal to the X driver 37 and Y driver 36 in the LCD element 38. It is preferable to perform serial data transfer between the panel control circuit 32 and main circuit 2, because fewer wires are required. In achieving serial data transfer, the panel control circuit 32 controls the serial data transfer and monitors the dial keys 6 and operation keys 5 constantly so as to run a series of jobs of detecting key depressing, detecting and deleting a chatter portion, and transmitting the result to the main circuit 2. These jobs can be achieved by sequentially running programs stored in the ROM 34.

FIG. 3 shows an outward appearance arrangement of a facsimile apparatus 40 of the present embodiment. The operation panel 1 serving as a man-machine interface is formed on the surface of a facsimile main body 41 as a housing of the facsimile apparatus 40. Besides the display section 3, the operation panel 1 is provided with the operation keys 5 and dial keys 6 forming the input operating section 4. The facsimile apparatus 40 includes a handholdable scanner that scans the surface of an original document as the image reading apparatus 17. A handset is provided as the transmitter/receiver 21 of FIG. 1, so that telephone communication by voice is also available. The antenna 23 is used for communication with an unillustrated cordless extension unit.

By means of an input operation to depress the operation keys 5 or dial keys 6 in the operation panel 1 of the facsimile apparatus 40, the user inputs a command or information to the facsimile apparatus 40, and reads out operation information of the facsimile apparatus 40 or a command from the facsimile apparatus 40 on the display section 3. As has been discussed, the operation panel 1 is a portion where the user touches directly and a portion susceptible to direct influence of static electricity collected on the user.

Figure 4:
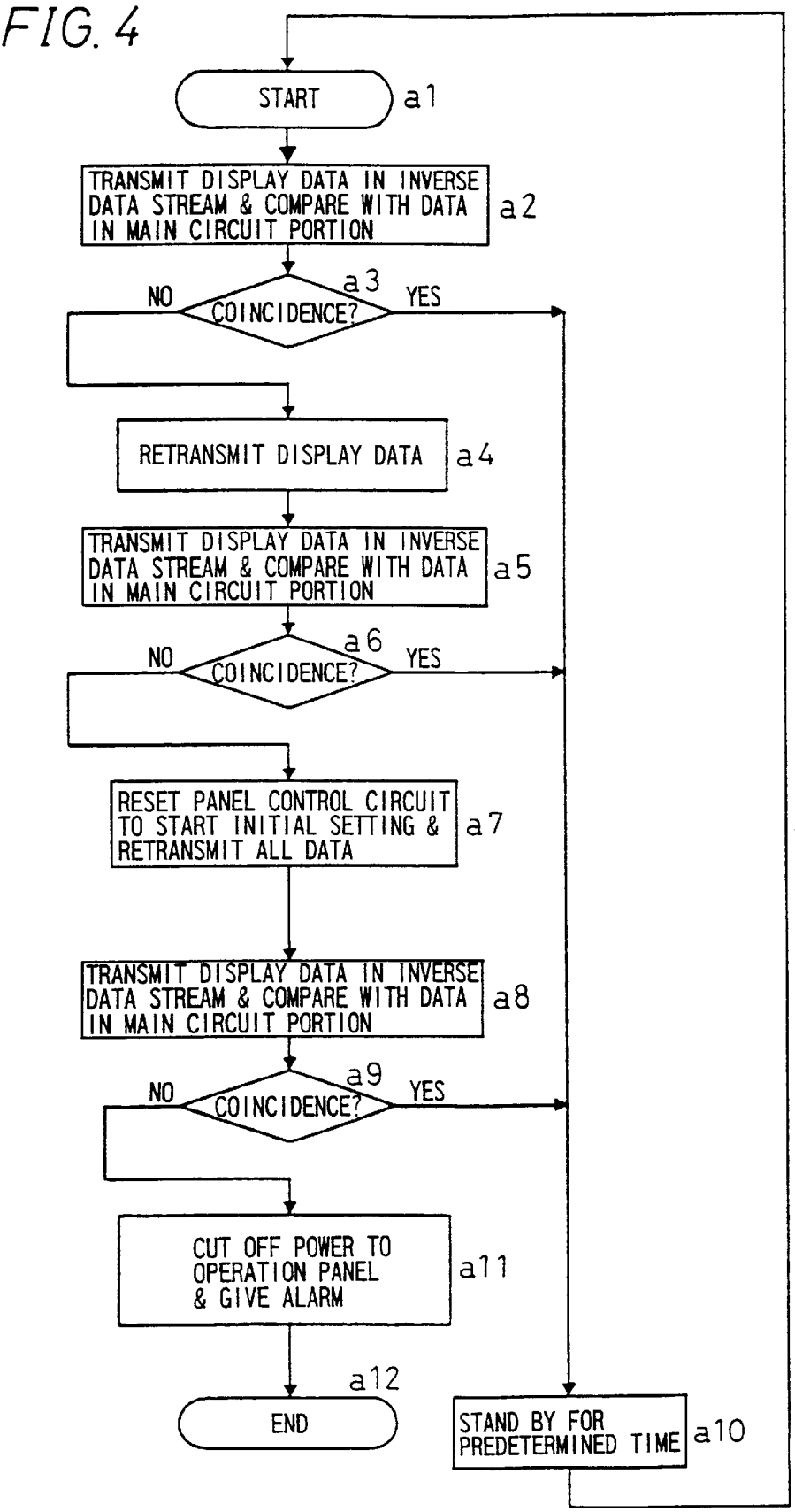
FIG. 4 is a flowchart detailing a malfunction detection and recovery process in a display section 3 of the facsimile apparatus of FIG. 1.

FIG. 4 is a view detailing a malfunction detection and recovery process procedure in the display section 3 of the facsimile apparatus 40 in accordance with the embodiment. The procedure begins from step a1. The procedure starts each time the predetermined condition is satisfied in accordance with specified rules or at regular time intervals, for example. At step a2, data of a bit map displayed on the LCD element 38 is transmitted to the main circuit 2 from the RAM 35 in an inverse data stream. Generally, in the main circuit 2, the original data of the data to be displayed on the display section 3 is stored in the form of coded information in the volatile RAM 20 used as a work area. In the panel control circuit 32 shown in FIG. 2, coded information transmitted from the main circuit 2 is developed into a bit map by means of a character generator provided in the ROM 34, and the resulting bit map is displayed on the LCD element 38. The data of the bit map displayed on the LCD element 38 is stored in the RAM 35. The control apparatus 14 shown in FIG. 1 develops the stored coded data to a bit map by means of a character generator, and compares the resulting bit map with the data of bit map transmitted from the display section 3 on the operation panel 1 in an inverse data stream.

At step a3, whether the bit map data transmitted from the operation panel 1 in an inverse data stream and the bit map data based on the coded information stored in the main circuit 2 coincide with each other is judged. When it is determined that the bit map data transmitted from the operation panel 1 and the bit map data base on the coded information are discrepant, at step a4, the coded information stored in the main circuit 2 is retransmitted to the operation panel 1 to amend the display data into the correct data. Subsequently, at step a5, the display data is transmitted again in an inverse data stream, and compared with the bit map data based on the coded information stored in the main circuit 2. At step a6, when the data is determined as being discrepant again as a result of data comparison, the discrepancy is determined as being a serious malfunction such that causes a runaway of the CPU 33 in the panel control circuit 32. For this reason, at step a7, a command to the panel control circuit 32 to reset the operation and restart from the initial setting is issued, and further retransmits all the data necessary for the display. Upon receipt of the reset command from the main circuit 2, the CPU 33 in the panel control circuit 32 starts the initial setting operation.

At subsequent step a8, the display data is transmitted again in an inverse data stream and compared with the data stored in the main circuit 2. When the display data is determined as being coincident with the data stored in the main circuit at step a9 as a result of data comparison, after a standby of a predetermined time (step a10), the procedure returns to step a1. Here, when it is determined that the display data coincides with the data stored in the main circuit in the comparison at step a3 or a6, after the standby of the predetermined time (step a10), the procedure returns to step a1.

When the comparison result shows a discrepancy in data at step a9, the discrepancy is determined as being a serious malfunction, such as the latch-up, or a failure in the electronic circuit, such as an LSI, employed in the panel control circuit 32 in the operation panel 1, and therefore, supply of power to the operation panel 1 is cut off. At the same time, the user is alerted by an alarming sound, a voice error message, etc., and then the procedure is completed at step a12. A component to which supply of power is cut off is not necessarily limited to the operation panel 1. Although supply of power to the operation panel 1 does not have to be cut off entirely, supply of power to at least a portion that is assumingly involved in the malfunction has to be cut off.

Figure 5:
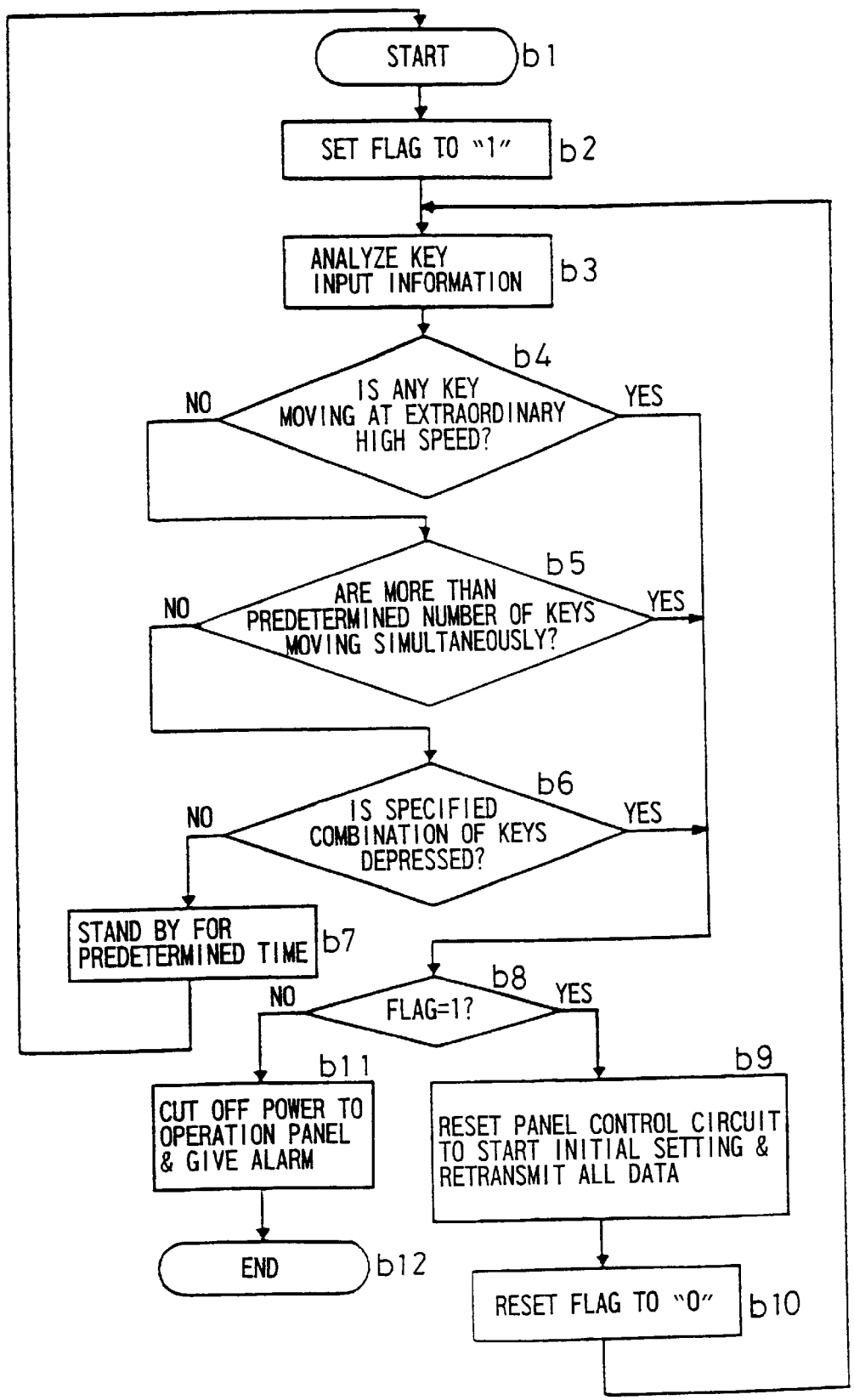
FIG. 5 is a flowchart detailing a key depressing information analyzing procedure in an operation panel 1 of the facsimile apparatus of FIG. 1.

FIG. 5 is a view detailing a key depressing information analyzing procedure in the input operating section 4 on the operation panel 1. FIG. 5 shows one embodiment of the invention, and the arrangement and operations of the input operating section 4 vary markedly depending on the functions furnished to the apparatus. Therefore, contents detectable as a malfunction vary with each apparatus. It should be appreciated, however, that the invention encompasses all the ideas of detecting abnormal depressing information that is not generated in a normal operation by the user.

The key depressing information analyzing procedure in the operation panel 1 begins with step b1, and at step b2, the flag is set to "1". At step b3, key input information transmitted from the operation panel 1 to the main circuit 2 is analyzed to identify abnormal data of the keys. At step b4, judgment of abnormality on the keys is carried out by checking whether any of the keys is moving at an extraordinary high speed. When the keys are determined as being free of abnormality, whether more than a predetermined number of keys are moving simultaneously is judged at step b5. Subsequently, when it is determined that there is no simultaneous movement of keys, whether a combination of keys that are not supposed to be depressed simultaneously, such as the start key and stop key, is depressed or not is checked at step b6. When no abnormality is detected, after a standby of a predetermined time (step b7), the procedure returns to the step b1. When it is determined that any abnormality is not found at step b4, b5, or b6, the procedure proceeds to step S8, and checks the flag. When the flag exhibits "1", the panel control circuit 32 is reset at step b9, and a series of jobs from the initial setting to retransmission of all the data are carried out. Subsequently, the flag is set to "0" at step b10, and the procedure returns to step b3.

When it is determined at step b8 that the flag does not exhibit "1", that is, when abnormality is detected after the flag is reset to "0" at step b10, the procedure proceeds to step b11, supply of power to the operation panel 1 is cut off and an alarm is issued, and then the procedure ends at step b12. More specifically, the flag is initially set to "1", and when a key input inconvenience occurs once, judgment of inconvenience on key input is carried out again. When the inconvenience is not eliminated, the inconvenience is determined as being a critical inconvenience such as the latch-up or a failure. Hence, the power to the operation panel 1 is cut off and an alarm is given, after which the procedure is completed.

The operation panel 1 serving as a man-machine interface in a communication apparatus, an information processing apparatus or the like is generally isolated from the main circuit 2 in the main body, and usually arranged in the easiest-to-use design or placed in the easiest-to-use location for the user. Therefore, the operation panel 1 is touched directly by the user and susceptible to static electricity. The type of a static-induced malfunction in the operation panel 1 can vary from simple garbled bits in the RAM 35 to a runaway of the panel control circuit 32 to the latch-up in the LSI, such as the panel control circuit 32. Adapting the invention can achieve an adequate malfunction recovery process at the level of each type of malfunction.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. Electronic apparatus having an operation panel which is provided with a display section and an input operating section and serves as a man-machine interface, comprising:

condition setting means for presetting a condition, under which an operation of detecting a malfunction in the operation panel is repeated;

information storing means for storing information transmitted as a display content for the display section of the operation panel;

content reading out means for reading out the display content displayed on the display section of the operation panel each time the condition set in the condition setting means is satisfied;

malfunction judging means for comparing the display content read out by the content reading out means and displayed on the display section with the information stored in the information storing means, and based on a comparison result, judging whether there is a malfunction in the operation panel; and malfunction recovering means for, when the malfunction judging means determines that there is a malfunction in the operation panel, effecting a predetermined control for malfunction recovery, wherein the malfunction judging means analyzes input information in the input operating section of the operation panel, and based on a result of analysis, judges whether there is a malfunction in the operation panel.

2. The Electronic apparatus having an operation panel of claim 1, wherein the malfunction recovering means carries out a recovery process comprising retransmission of the information stored in the information storing means to the display section of the operation panel as a control for malfunction recovery, and when the malfunction is not recovered by the recovery process, supply of power to at least the operation panel is cut off.

3. Electronic apparatus having an operation panel which is provided with a display section and an input operating section and serves as a man-machine interface, comprising:

condition setting means for presetting a condition, under which an operation of detecting a malfunction in the operation panel is repeated;

information storing means for storing information transmitted as a display content for the display section of the operation panel;

content reading out means for reading out the display content displayed on the display section of the operation panel each time the condition set in the condition setting means is satisfied;

malfunction judging means for comparing the display content read out by the content reading out means and displayed on the display section with the information stored in the information storing means, and based on a comparison result, judging whether there is a malfunction in the operation panel; and malfunction recovering means for, when the malfunction judging means determines that there is a malfunction in the operation panel, effecting a predetermined control for malfunction recovery, wherein the malfunction recovering means carries out a recovery process comprising retransmission of the information stored in the information storing means to the display section of the operation panel as a control for malfunction recovery, and when the malfunction is not recovered by the recovery process, supply of power to at least the operation panel is cut off.

4. Electronic apparatus having an operation panel which is provided with a display section and an input operating section and serves as a man-machine interface, comprising:

condition setting unit for presetting a condition, under which an operation of detecting a malfunction in the operation panel is repeated;

information storing unit for storing information transmitted as a display content for the display section of the operation panel;

content reading out unit for reading out the display content displayed on the display section of the operation panel each time the condition set in the condition setting unit is satisfied;

malfunction judging unit for comparing the display content read out by the content reading out unit and displayed on the display section with the information stored in the information storing unit, and based on a comparison result, judging whether there is a malfunction in the operation panel; and malfunction recovering unit for, when the malfunction judging unit determines that there is a malfunction in the operation panel, effecting a predetermined control for malfunction recovery, wherein the malfunction judging unit analyzes input information in the input operating section of the operation panel, and based on a result of analysis, judges whether there is a malfunction in the operation panel.

5. The Electronic apparatus having an operation panel of claim 4, wherein the malfunction recovering unit carries out a recovery process comprising retransmission of the information stored in the information storing unit to the display section of the operation panel as a control for malfunction recovery, and when the malfunction is not recovered by the recovery process, supply of power to at least the operation panel is cut off.

6. Electronic apparatus having an operation panel which is provided with a display section and an input operating section and serves as a man-machine interface, comprising:

condition setting unit for presetting a condition, under which an operation of detecting a malfunction in the operation panel is repeated;

information storing unit for storing information transmitted as a display content for the display section of the operation panel;

content reading out unit for reading out the display content displayed on the display section of the operation panel each time the condition set in the condition setting unit is satisfied;

malfunction judging unit for comparing the display content read out by the content reading out unit and displayed on the display section with the information stored in the information storing unit, and based on a comparison result, judging whether there is a malfunction in the operation panel; and malfunction recovering unit for, when the malfunction judging unit determines that there is a malfunction in the operation panel, effecting a predetermined control for malfunction recovery, wherein the malfunction recovering unit carries out a recovery process comprising retransmission of the information stored in the information storing unit to the display section of the operation panel as a control for malfunction recovery, and when the malfunction is not recovered by the recovery process, supply of power to at least the operation panel is cut off.

7. A method for detecting a malfunction in an operation panel and recovering therefrom, comprising:

presetting a condition in a condition setting unit, under which an operation of detecting a malfunction in the operation panel is repeated;

storing information transmitted as a display content for the display section of the operation panel in an information storing unit;

reading out the display content displayed on the display section of the operation panel each time the condition set in the condition setting unit is satisfied in a content reading out unit;

comparing the display content read out by the content reading unit and displayed on the display section with the information stored in the information storing unit and, based on a comparison result, judging whether there is a malfunction in the operation panel; and effecting a predetermined control for malfunction recovery in a malfunction recovery unit when the malfunction judging unit determines that there is a malfunction in the operation panel, wherein the malfunction judging unit analyzes input information in the input operating section of the operation panel, and based on a result of analysis, judges whether there is a malfunction in the operation panel.

8. The method of claim 7, wherein the malfunction recovering means carries out a recovery process comprising retransmission of the information stored in the information storing means to the display section of the operation panel as a control for malfunction recovery, and when the malfunction is not recovered by the recovery process, supply of power to at least the operation panel is cut off.

9. A method for detecting a malfunction in an operation panel and recovering therefrom, comprising:

presetting a condition in a condition setting unit, under which an operation of detecting a malfunction in the operation panel is repeated;

storing information transmitted as a display content for the display section of the operation panel in an information storing unit;

reading out the display content displayed on the display section of the operation panel each time the condition set in the condition setting unit is satisfied in a content reading out unit;

comparing the display content read out by the content reading unit and displayed on the display section with the information stored in the information storing unit and, based on a comparison result, judging whether there is a malfunction in the operation panel; and effecting a predetermined control for malfunction recovery in a malfunction recovery unit when the malfunction judging unit determines that there is a malfunction in the operation panel, wherein the malfunction recovering means carries out a recovery process comprising retransmission of the information stored in the information storing means to the display section of the operation panel as a control for malfunction recovery, and when the malfunction is not recovered by the recovery process, supply of power to at least the operation panel is cut off.

* * * * *